US008930851B2

(12) United States Patent
Gebhart et al.

(10) Patent No.: US 8,930,851 B2
(45) Date of Patent: Jan. 6, 2015

(54) VISUALLY REPRESENTING A MENU STRUCTURE

(75) Inventors: Alexander Gebhart, Ubstadt-Weiher (DE); Clemens Daeschle, Neckarsteinach (DE)

(73) Assignee: SAP SE, Walldorf (DE)

( * ) Notice: Subject to any disclaimer, the term of this patent is extended or adjusted under 35 U.S.C. 154(b) by 609 days.

(21) Appl. No.: 13/282,110

(22) Filed: Oct. 26, 2011

(65) Prior Publication Data

US 2013/0111406 A1 May 2, 2013

(51) Int. Cl.
G06F 3/00 (2006.01)
G06F 3/0482 (2013.01)
G06F 3/0487 (2013.01)
G06F 17/30 (2006.01)

(52) U.S. Cl.
CPC ............ G06F 3/0482 (2013.01); G06F 3/0487 (2013.01); G06F 17/30994 (2013.01)
USPC ............ 715/834; 715/769; 715/823; 715/853

(58) Field of Classification Search
CPC ............ G06F 3/0482; G06F 17/30994; G06F 3/04847
USPC .................. 715/769, 834, 823, 853
See application file for complete search history.

(56) References Cited

U.S. PATENT DOCUMENTS 6,144,378 A * 11/2000 Lee ................. 715/767
6,333,826 B1 * 12/2001 Charles ............ 359/725
6,359,635 B1 * 3/2002 Perttunen ............ 715/834
7,555,476 B2 * 6/2009 Holbrook ............ 715/700
2002/0122072 A1 * 9/2002 Selker ............... 345/834
2004/0263533 A1 * 12/2004 Yamamoto et al. ........... 345/619
2006/0092769 A1 * 5/2006 Demas ............. 368/82
2006/0117067 A1 * 6/2006 Wright et al. ............. 707/104.1
2009/0183100 A1 * 7/2009 Eom et al. ............ 715/769
2010/0058196 A1 * 3/2010 Krishnan et al. ............. 715/747
2010/0131881 A1 * 5/2010 Ganesh ............ 715/769
2010/0229130 A1 * 9/2010 Edge et al. ............ 715/863
2011/0219324 A1 * 9/2011 Watanabe et al. ............. 715/771
2011/0246454 A1 * 10/2011 Ko ................. 707/722

(Continued)

OTHER PUBLICATIONS

Gerber et al., The spin menu: a menu system for virtual environments, 2005, Proceedings of the 2005 IEEE Conference, computer.org.*

(Continued)

Primary Examiner — Jordany Nunez
(74) Attorney, Agent, or Firm — Fish & Richardson P.C.

(57) ABSTRACT

A navigator component is displayed including (i) a home icon configured to transition the navigator component to an earlier state, (ii) user-selectable rings that are centered on the home icon and represent sets of the menu views, including a first ring that currently has a visual indication of selection, and (iii) first user-selectable icons that belong to the first ring and are located between the home icon and at least one of the user-selectable rings, each first user-selectable icon configured to cause one of the menu views to be displayed. A user input is received that selects a second ring of the user-selectable rings. An updated navigator component is displayed, (i) including second user-selectable icons that belong to the second ring, instead of the first user-selectable icons, and (ii) wherein the second ring currently has, and the first ring currently does not have, the visual indication of selection.

18 Claims, 12 Drawing Sheets

(56) References Cited

U.S. PATENT DOCUMENTS

| | | | |
|---|---|---|---|
| 2012/0066646 A1* | 3/2012 | Purdy et al. | 715/834 |
| 2012/0173975 A1* | 7/2012 | Herz et al. | 715/716 |
| 2013/0080975 A1* | 3/2013 | Geithner | 715/828 |
| 2014/0118563 A1* | 5/2014 | Mehta et al. | 348/207.1 |

OTHER PUBLICATIONS

"SAP Solution Manager 7.0 Work Centers for IP Operations: System Monitoring, System Administration, System Landscape Management," *SAP AG*, 2008, 16 pages.

'User Interface' [online]. Wikipedia, 2010, [retrieved on Oct. 26, 2011]. Retrieved from the Internet: <URL: http://web.archive.org/web/20101019014901/http:/en.wikipedia.org/wiki/User_interface>, 4 pages.

'Computer icon' [online]. Wikipedia, 2010, [retrieved on Oct. 26, 2011]. Retrieved from the Internet: <URL: http://web.archive.org/web/20100124225516/http:/en.wikipedia.org/wiki/Computer_icon>, 3 pages.

'7 Useful Windows Desktop Gadgets' [online]. MakeTech Easier, 2011, [retrieved on Oct. 26, 2011]. Retrieved from the Internet: <URL: http://maketecheasier.com/7-useful-windows-desktop-gadgets/2011/03/18>, 9 pages.

'Work Center' [online]. SAP, [retrieved on Oct. 26, 2011]. Retrieved from the Internet: <URL: http://help.sap.com/saphelp_40b/helpdata/en/bl/c03424439a11d189410000e829fbbd/content.htm>, 3 pages.

'Work Centers in SAP Solution Manager' [online]. SAP, [retrieved on Oct. 26, 2011]. Retrieved from the Internet: <URL: http://www.sdn.sap.com/irj/sdn/index?rid=/webcontent/uuid/a0dc7c37-e5d7-2a10-a783-9cOaea957c20#section3>, 2 pages.

'Work Center' [online]. SAP, [retrieved on Oct. 26, 2011]. Retrieved from the Internet: <URL: http://help.sap.com/saphelp_45b/helpdata/en/d7/45f364b10811d2a5e30060087a7a74/content.htm>, 2 pages.

'Elements of a SAP GUI Window' [online]. SAP Library, [retrieved on Oct. 26, 2011]. Retrieved from the Internet: <URL: http://help.sap.com/saphelp_nw70ehp1/helpdata/en/fl/6d2e42e1ef5633e10000000a155106/content.htm>, 1 page.

'The Menu Bar' [online]. SAP Library, [retrieved on Oct. 26, 2011]. Retrieved from the Internet : <URL: http://help.sap.com/saphelp_nw70ehp1/helpdata/en/38/d73442d692ae04e10000000a1550b0/content.htm>, 1 page.

'The Title Bar and the Application Toolbar' [online]. SAP Library, [retrieved on Oct. 26, 2011]. Retrieved from the Internet: <URL: http://help.sap.com/saphelp_nw70ehpl/helpdata/en/d6/d63442d692ae04e10000000a1550b0/content.htm>, 1 page.

'The Dynpro Area' [online]. SAP Library, [retrieved on Oct. 26, 2011]. Retrieved from the Internet: <URL: http://help.sap.com/saphelp_nw70ehpl/helpdata/en/b8/7e35422e5fb86be10000000 a155106/content.htm>, 1 page.

'The Status Bar', [online]. SAP Library, [retrieved on Oct. 26, 2011]. Retrieved from the Internet: <URL: http://help.sap.com/saphelp_nw70ehpl/helpdata/en/ab/f53642e2a3ab04e10000000 a1550b0/content.htm>, 1 page.

\* cited by examiner

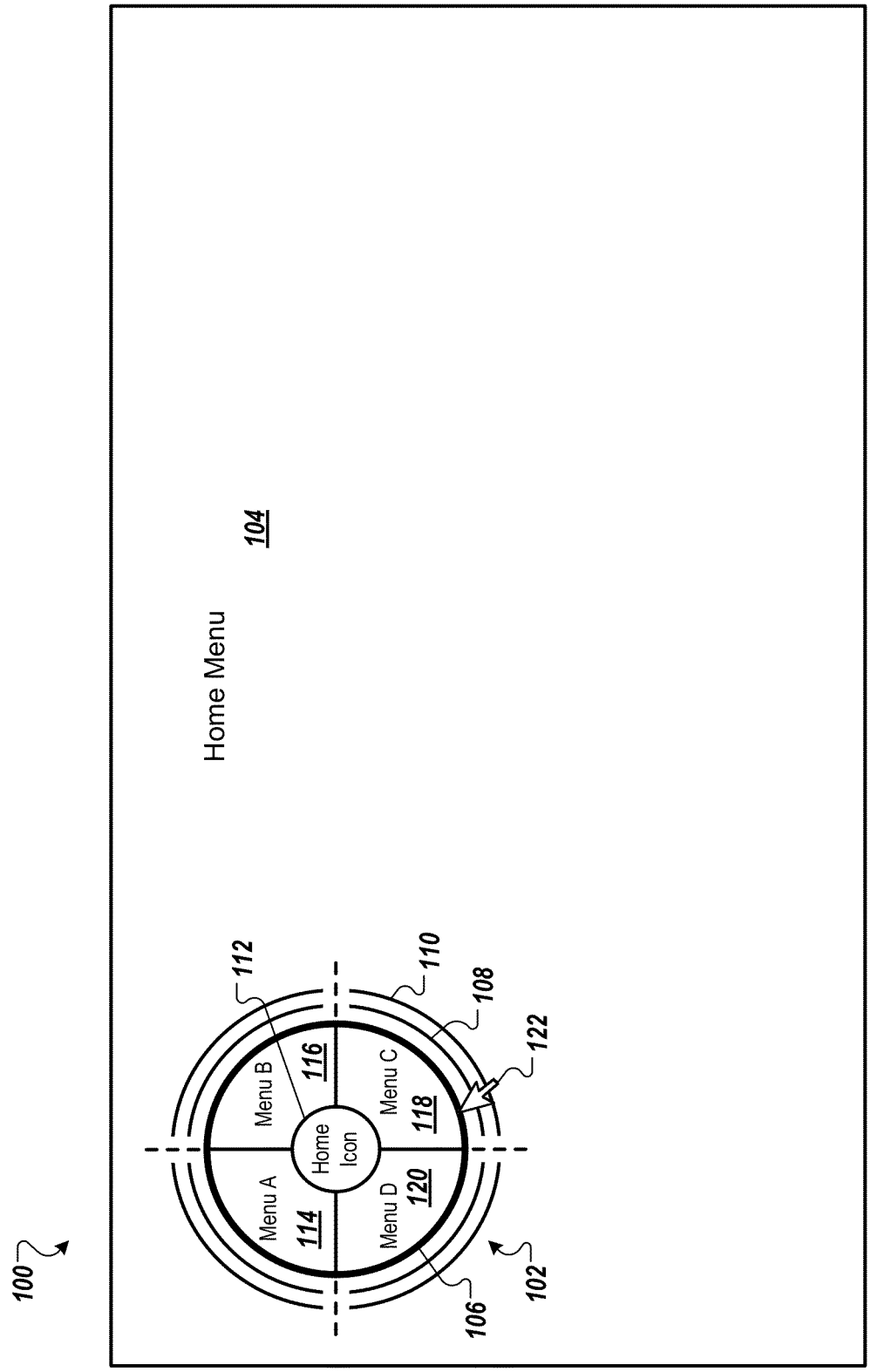

VISUALLY REPRESENTING A MENU STRUCTURE

TECHNICAL FIELD

This document relates to user interfaces.

BACKGROUND

A graphical user interface (GUI) can include various types of user interface controls. For example, a GUI can include a menu bar which includes a set of menu title controls. Each menu title control can include a set of menu item controls. Each menu item control can provide access to an application function. A menu bar is often displayed at the top of a GUI. A GUI can also include a toolbar which can include a set of buttons, where each button can provide access to an application function. A tab control can be used to organize sets of user interface controls. For example, each of multiple tab controls can include a set of user interface controls grouped according to some common characteristic. The multiple tab controls can be grouped, such as in a notebook control. The notebook control can display tab names, such as across the top of the notebook control, and a user can select a tab name to gain access to the set of user interface controls included in a particular tab control.

SUMMARY

Particular embodiments of the subject matter described in this specification can be implemented to realize one or more of the following advantages. A user can see how many menu views are available from a user interface without having to scroll the user interface. The most important menu views can be accessible from an initial state of a navigator component. A navigator component can occupy less than the full width of a user interface, allowing for content to be displayed at the top of the user interface. A navigator component including user-selectable rings representing a structure of menu views can provide a unique, visually appealing user interface for an application. A navigator component can provide access to dozens of menu views from various types of user interfaces, including a relatively small user interface displayed on a mobile device. A navigator component can provide a new and unique user experience.

The details of one or more implementations are set forth in the accompanying drawings and the description below. Other features and advantages will be apparent from the description and drawings, and from the claims.

DESCRIPTION OF DRAWINGS

FIGS. 1A-B, 2, and 5 illustrate example user interfaces that include a navigator component and a content area.

Like reference symbols in the various drawings indicate like elements.

DETAILED DESCRIPTION

Figure 1B:
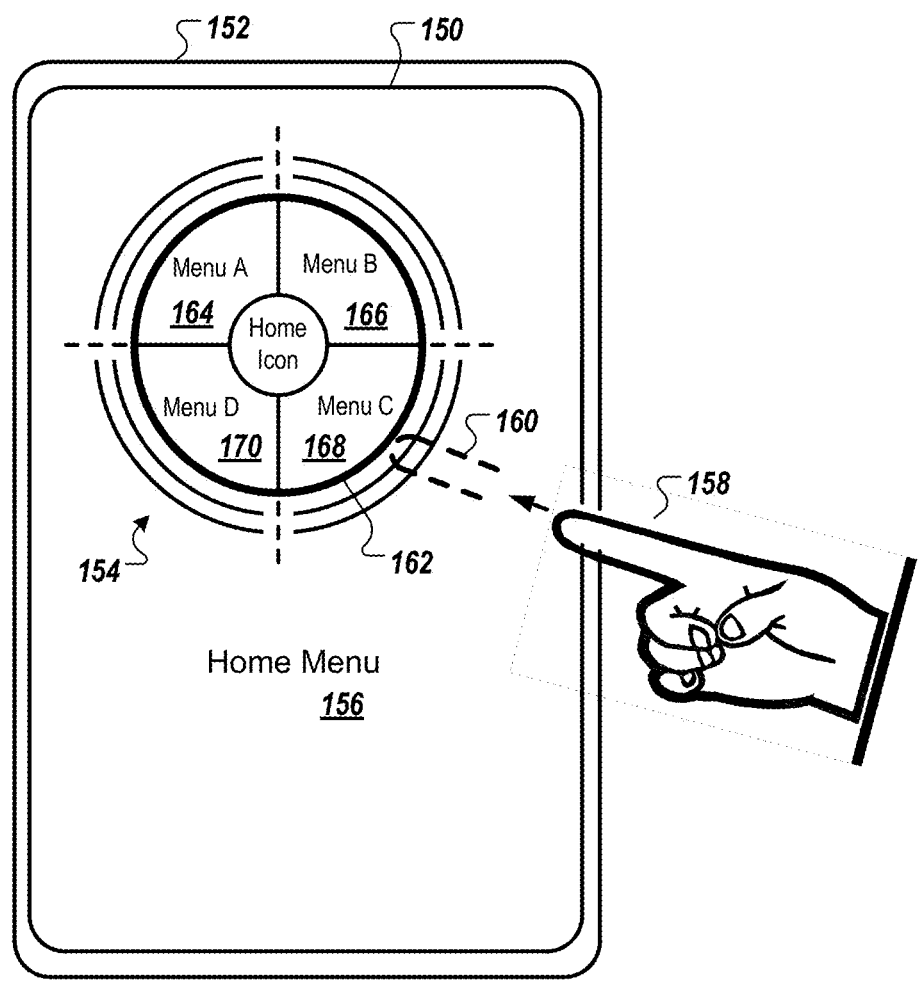

FIG. 1 illustrates an example user interface 100 that includes a navigator component 102 and a content area 104. The navigator component 102 can be located, for example, in the upper left corner of the user interface 100, or in any other location. While one or more other controls, such as a menu bar or a tool bar, might occupy the entire width of the user interface 100, making the top of the user interface 100 unusable for other content, the navigator component 102 can occupy less than the full width of the user interface 100, allowing content to be displayed at the top of the content area 104 (e.g., at the top of the user interface 100).

The navigator component 102 visually represents a structure of menu views. A menu view can be, for example, a working environment for a user that provides access to specific functions. In some implementations, the menu view provides the user a choice between multiple work center views, wherein each work center view collects some tools, functions, and information relating to a particular concept. Using a menu view, a user can access, for example, messages, alerts, reports, documents, and one or more task or work lists. Based on a user's role, a user can have access to multiple menu views. The content area 104 currently displays content for a home menu view.

The navigator component 102 includes a set of user selectable rings 106, 108, and 110. Each of the user selectable rings 106, 108, and 110 is centered on a home icon 112 and represents a corresponding set of menu views. Each of the user selectable rings 106, 108, and 110 is associated with a set of user-selectable icons that may or may not be visible. For example, the user-selectable ring 106 is associated with user-selectable icons 114, 116, 118, and 120 which are currently visible in the navigator component 102. Four user-selectable icons are shown, but any other number of user-selectable icons can be used in some implementations.

The user-selectable rings 108 and 110 are each associated with different, other sets of user-selectable icons, which are not currently displayed. Each of the user-selectable rings 106, 108, and 110 indicates that a set of menu views is available. With the use of the rings 106, 108, and 110, and user-selectable icons, such as the user-selectable icons 114, 116, 118, and 120, the navigator component 102 indicates how many menu views are currently available and provides user navigation to any of the menu views.

The user-selectable icons 114, 116, 118, and 120 are located between the home icon 112 and the user selectable ring 106. Each of the user-selectable icons 114, 116, 118, and 120 corresponds to a menu view. For example, the user selectable icons 114, 116, 118, and 120 correspond to menu views for menus "A", "B", "C", and "D", respectively. The set of user-selectable icons 114, 116, 118, and 120 can be an initially displayed (e.g., default) set of user-selectable icons. In some implementations, the user can select the home icon 112 to display the default set of user-selectable icons 114, 116, 118, and 120, such as after the user has navigated to a different set of user-selectable icons.

In general, user-selectable icons, such as the user-selectable icons 114, 116, 118, and 120, can be organized into sets based on various criteria. For example, the user-selectable icons 114, 116, 118, and 120 may have been organized into a set based on the corresponding menu views being the four most frequently used menu views among all available menu views. The most frequently used menu views can be determined over time, such as for all users, or the determination can be dynamically determined, such as for each user, where a user's use of menu views is monitored and a default set of user-selectable icons can change based on a user's use of the navigator component 102. As another example, the user-selectable icons for a set can be selected based on a user role. For example, for a user having a role of purchaser, a default set of user-selectable icons can include user-selectable icons corresponding to the menu views most frequently used by purchasers. For example, the user-selectable icons 114, 116, 118, and 120 can correspond to menu views for working with open purchase orders, closed purchase orders, suppliers, and contracts, respectively.

A designer can design each of the user-selectable icons 114, 116, 118, and 120 to include, for example, one or more images illustrating or representing open purchase orders, closed purchase orders, contracts, and suppliers, respectively. The designer can design the individual user-selectable icons 114, 116, 118, and 120 such that the entire set of the user-selectable icons 114, 116, 118, and 120, viewed as a whole, represents a category to which each of the user-selectable icons 114, 116, 118, and 120 belong, such as purchasing. That is, each individual user-selectable icon 114, 116, 118, and 120 can be designed to be recognizable as corresponding to particular functionality offered by a corresponding menu view, and the user-selectable icons 114, 116, 118, and 120 as viewed together as a composite icon can be designed to be recognizable as corresponding to a particular category of menu views, such as purchasing.

Each of the user-selectable icons 114, 116, 118, and 120 is configured to cause, upon user selection, an associated menu view to be displayed. For example, as described in more detail below, if a user selects the user-selectable icon 114, a menu view for a menu "A" can be displayed in the content area 104. Selection can be done using, for example, a cursor controlled by an input device, such as a cursor 122. In some implementations, the user-selectable icon 114, 116, 118, or 120, or the user-selectable ring 106, 108, or 110 can be selected by hovering the cursor 122 over, or placing the cursor 122 on, a respective item and performing some other action, such clicking a mouse button or tapping with a stylus.

In the current state of the navigator component 102, the user-selectable ring 106 is selected and therefore has visual indication of selection. For example, here the visual indication of selection includes having a thicker line width than the other, currently unselected, user selectable-rings 108 and 110. Any of the user-selectable rings 106, 108, or 110 can have a visual indication of selection. Other visual indications of selection can be used.

Some implementations have a screen that is at least in part sensitive to touch and that can therefore be used to make input(s). FIG. 1B illustrates an example mobile device user interface 150 displayed on a mobile device 152. The mobile device user interface 150 includes a navigator component 154 and a content area 156. As illustrated by a finger 158 and a finger outline 160, the finger 158 can be used to select a user-selectable ring 162 included in the navigator component 154. As another example, the user can use the finger 158 to select a user-selectable icon 164, 166, 168, or 170. In some implementations, if the user selects one of the user-selectable icons 164, 166, 168, or 170, the navigator component 154 disappears or collapses to a smaller size to accommodate the displaying of a menu view, associated with the selected user-selectable icon 164, 166, 168, or 170, in the content area 156.

Figure 2:
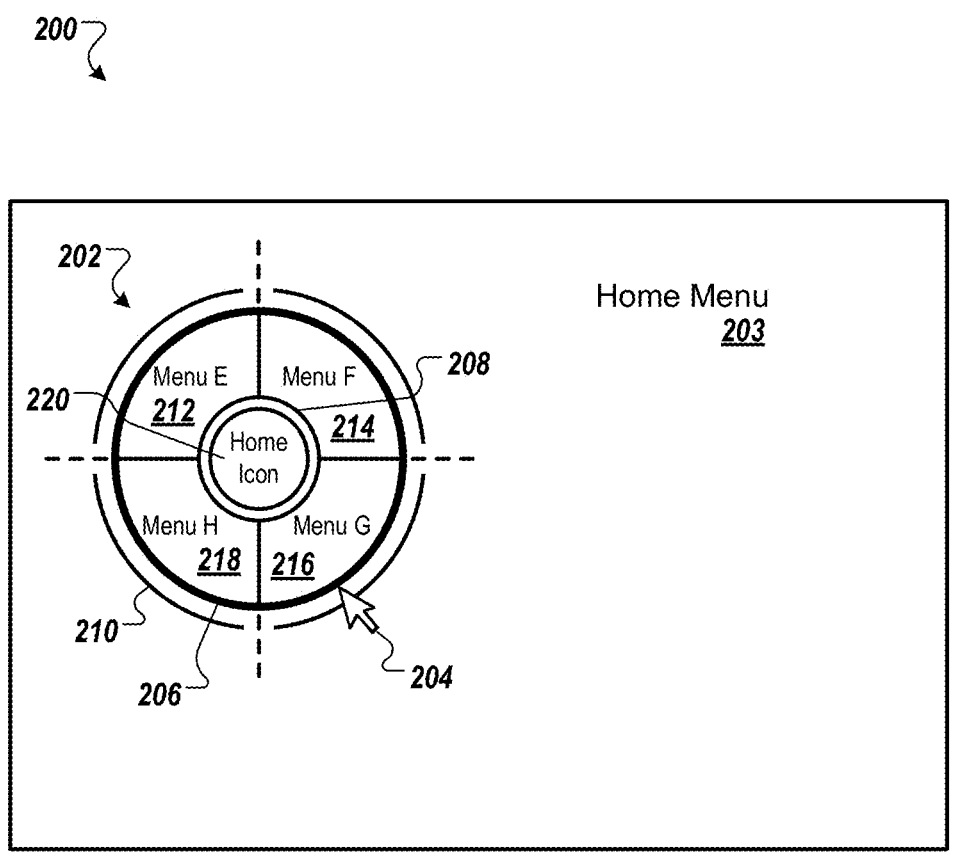

FIG. 2 illustrates an example user interface 200 that includes a navigator component 202 and a content area 203. As illustrated by a cursor 204, a user has selected a user-selectable ring 206. A previously-selected user-selectable ring can be, for example, a user-selectable ring 208.

In response to selection of the user-selectable ring 206, the navigator component 202 can change so that the selected user-selectable ring 206 has a visual indication of selection and the previously-selected user-selectable ring 208 does not have a visual indication of selection. For example, the user-selectable ring 206 has a thicker line width than the unselected user-selectable ring 208 and an unselected user-selectable ring 210. Also in response to selection of the user-selectable ring 206, user-selectable icons 212, 214, 216, and 218 belonging to the user-selectable ring 206 and corresponding to menu views for menus "E", "F", "G", and "H", respectively, can be displayed in the navigator component 202 instead of previously-displayed user-selectable icons associated with the user-selectable ring 208 (e.g., user-selectable icons corresponding to menu views for menus "A", "B", "C", and "D" as shown above with respect to FIG. 1A).

Giving a visual indication of selection to the selected user-selectable ring 206 can include transitioning one or more user-selectable rings from a collapsed state to an uncollapsed state and/or transitioning one or more user-selectable rings from an uncollapsed state to a collapsed state. A user-selectable ring can be in a collapsed state, for example, if the user-selectable ring is located outside of a home icon 220 and within the area occupied by the displayed user-selectable icons (e.g., the user-selectable icons 212, 214, 216, and 218). For example, the user-selectable ring 208 is in a collapsed state. A user-selectable ring can be in an uncollapsed state, for example, if it is located outside of the displayed user-selectable icons (e.g., outside of the user-selectable icons 212, 214, 216, and 218). For example, the user-selectable rings 206 and 210 are in an uncollapsed state.

Put another way, the visual indication of selection can be that the user-selectable ring 206 is currently a smallest user-selectable ring that is not in the collapsed state. Likewise, each of the user-selectable rings that are closer to the home icon 220 than the selected user-selectable ring 206 (e.g., the user-selectable ring 208) can be in a collapsed state relative to the home icon 220. Any of the user-selectable rings that is farther from the home icon 220 than the selected user-selectable ring 206 (e.g., the user-selectable ring 210) can be in an uncollapsed state.

In response to receiving a user input selecting a user-selectable ring (e.g., in response to selection of the user-selected ring 206), if the selected user-selectable ring is currently in the uncollapsed state, each other ring smaller than the user-selected ring that is currently also in the uncollapsed state can be changed to be in the collapsed state instead of the uncollapsed state. For example, if the user-selectable ring 208 was the previously selected user-selectable ring, the navigator component 202 may have appeared, before selection of the user-selectable ring 206, similar to the navigator component 102 of FIG. 1A, in that all of the user-selectable rings are in an uncollapsed state prior to selection of a user-selectable ring. In such an example, the user-selectable ring 208 can be changed to be in the collapsed state, as currently shown in FIG. 2, in response to selection of the user-selectable ring 206, because the user-selectable ring 208 can be, before selection of the user-selectable ring 206, a user-selectable ring that is smaller than the user-selectable ring 206 that is currently also in the uncollapsed state.

Also in response to receiving a user input selecting a user-selectable ring, if the selected user-selectable ring is currently in the collapsed state, the selected user-selectable ring, and each other ring larger than the user-selected ring that is currently also in the collapsed state, can be changed to be in an uncollapsed state instead of the collapsed state. For example, suppose that the navigator component 202 is in a state as shown in FIG. 2 and suppose that the user selects the user-selectable ring 208. The user-selectable ring 208 can be changed to be in an uncollapsed state and the navigator component 202 can be updated to appear similar to the navigator component 102 shown in FIG. 1A, in that all user-selectable rings are in the uncollapsed state.

As another example, suppose that the navigator component 202 is in a state as shown in FIG. 2 and suppose that the user selects the user-selectable ring 210. The navigator component 202 can be updated so that the user-selectable ring 206 is changed to be in a collapsed state (the user-selectable ring 208 can remain in the collapsed state). If the user subsequently selects the user-selectable ring 208, both the user-selectable ring 208 and the user-selectable ring 206 can be changed to be in the uncollapsed state instead of the collapsed state.

When one or more user-selectable rings are transitioned from either a collapsed state to an uncollapsed state or from an uncollapsed state to a collapsed state, the transitions can appear as fluid transitions, meaning that the navigator component 202 can change in a fluid, animated manner. As mentioned above, the home icon 220 can cause, when selected, the navigator component 202 to transition to an initial state, such as illustrated by the navigator component 102 shown in FIG. 1A. As another example, selecting the home icon 220 can cause the navigator component 202 to transition to a previous state, which may or may not be the initial state.

The content area 203 currently displays content for a home menu. For example, the user may have, since an initial state shown in FIG. 1A, selected the user-selectable ring 206 but may not have selected any of the user-selectable icons 212, 214, 216, 218 or any other user-selectable icon. In this example, initial, default content associated with a home menu can be displayed, as shown in FIG. 2. As another example, upon selection of the user-selectable ring 206, content associated with the set of user-selectable icons 212, 214, 216, and 218 can be displayed, such as overview content for the set of menus "E", "F", "G", and "H". As yet another example and as described in more detail below, one of the user-selectable icons 212, 214, 216, and 218, such as the user-selectable icon 212, can be automatically selected in response to selection of the user-selectable ring 206. In such an example, a menu view for the menu "E" can be displayed in the content area 203 in response to selection of the user-selectable ring 206.

Figure 3:
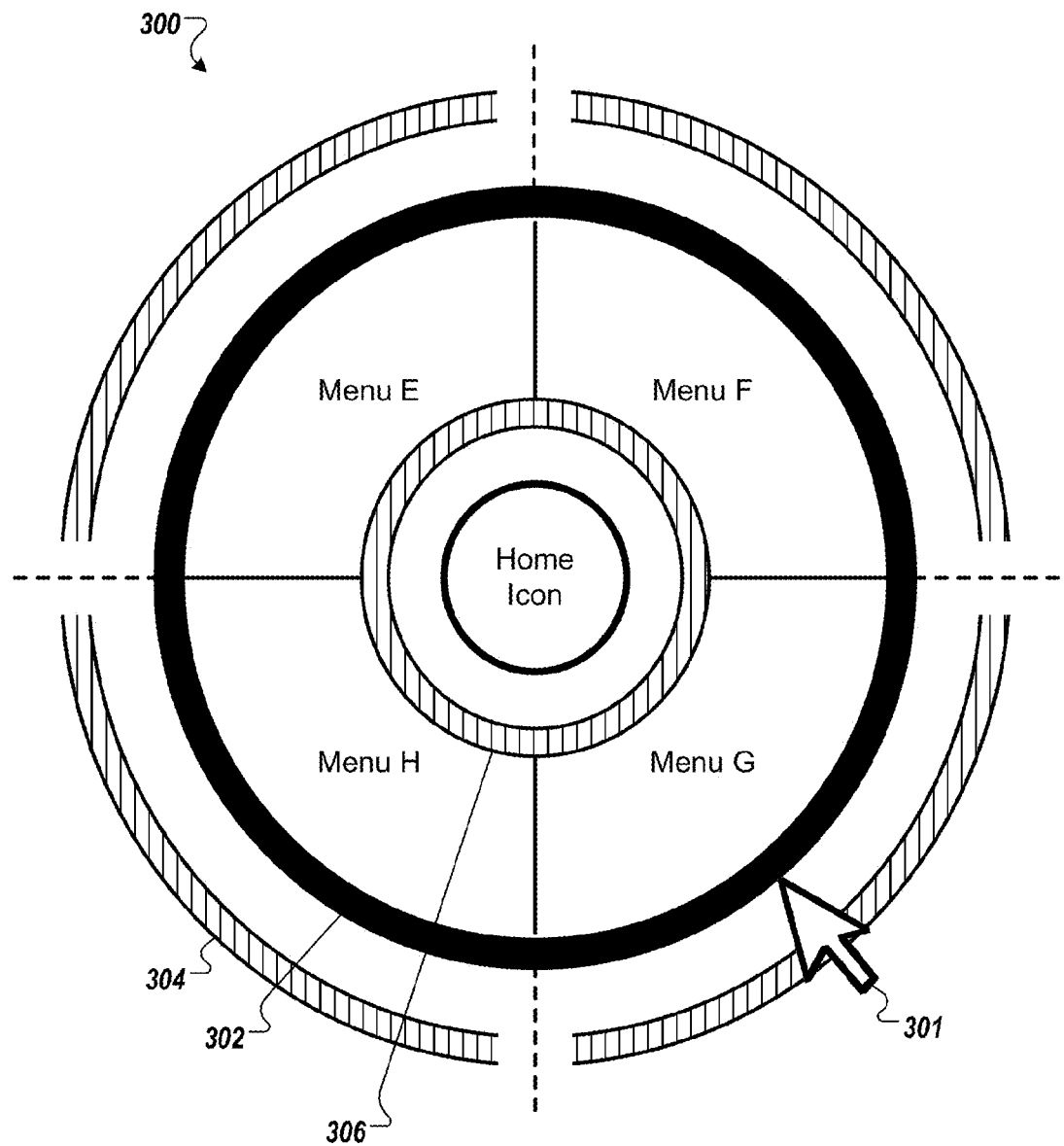
FIGS. 3, 4, 9, and 10 illustrate example navigator components.

FIG. 3 illustrates an example navigator component 300. As mentioned above, a user-selectable ring can be selected and a selected user-selectable ring can have a visual indication of selection, such as a thicker line width. A visual indication of selection can include color, instead of or in addition to another visual indication of selection. For example, as illustrated by a cursor 301, a user-selectable ring 302 is being selected. The selected user-selectable ring 302 can have a color of black, for example, and other, unselected user-selectable rings 304 and 306 can each have a different color, such as red.

Figure 4:
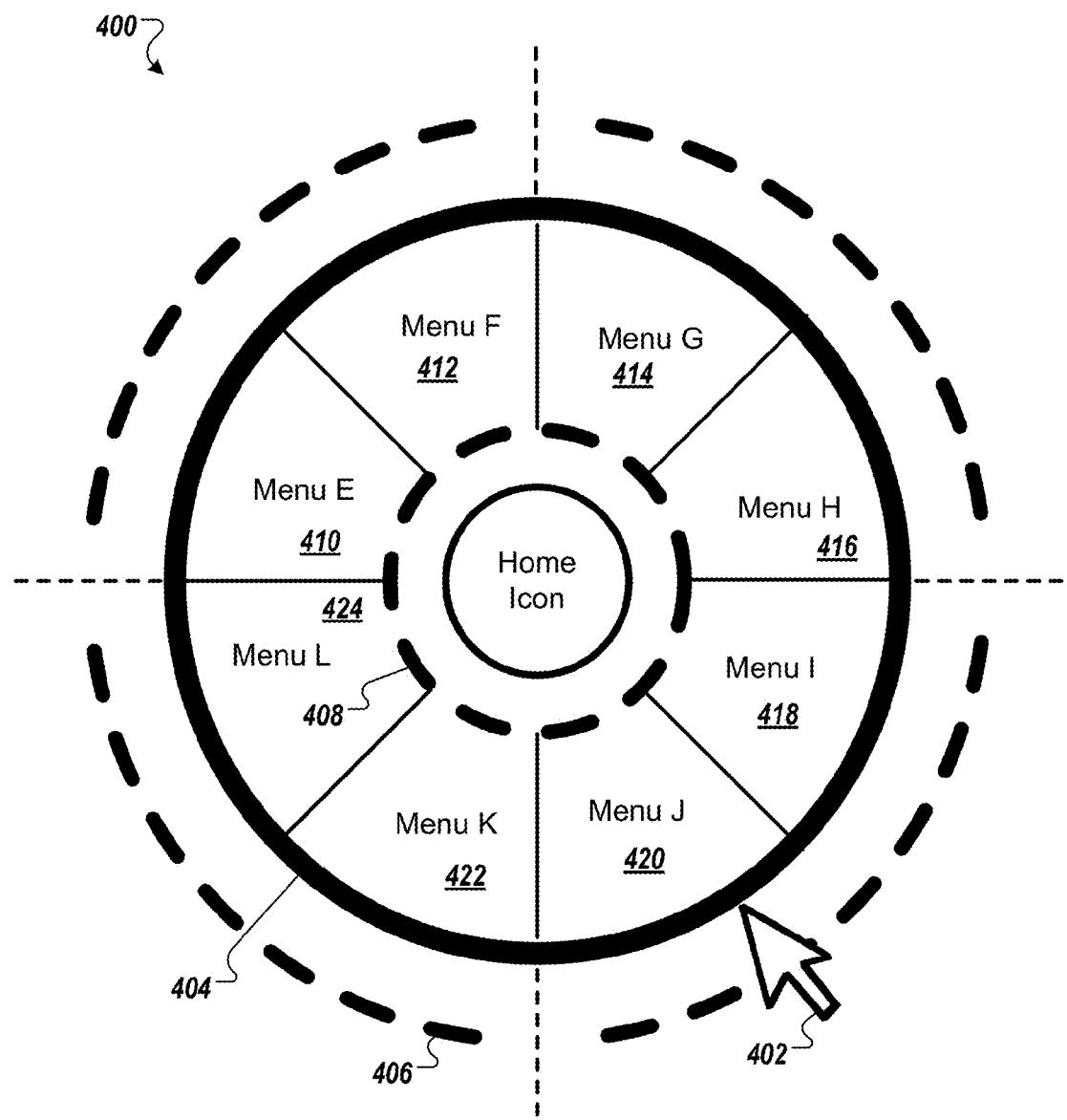

FIG. 4 illustrates an example navigator component 400. The example navigator component 400 illustrates another approach for visually indicating selection of a user-selectable ring. As illustrated by a cursor 402, a user-selectable ring 404 is being selected. The selected user-selectable ring 404 can have a visual indication of a solid black line. Other, unselected user-selectable rings 406 and 408 can be displayed using a different line style, such as a dashed line, as shown.

The user-selectable ring 404 includes eight user-selectable icons 410-424. The number of user-selectable icons included in the user-selectable ring 404 can be based, for example, on a role of the user. For example, a user with a role of purchaser may be presented with eight user-selectable icons per user-selectable ring while a user with another role may be presented with four user-selectable icons per user-selectable ring. In some implementations, the number of user-selectable icons per user-selectable ring may be based on a total number of menu views available to the user. For example, the number of user-selectable icons included in each user-selectable ring may be determined to be approximately the number of available menu views divided by four. In some implementations, the number of user-selectable icons included in a user-selectable ring may be determined based on historical use by the user. For example, an initial, default set of user-selectable icons may include a number of user-selectable icons, up to a predetermined number (e.g., eight), which have been used by the user at least a threshold number of times in a previous time period (e.g., the past week).

As described above, the navigator component 400 can be displayed on a mobile device. In some implementations, the number of user-selectable rings included in the navigator component 400 and the number of user-selectable icons per user-selectable ring can be determined based on the size of the user interface used to display the navigator component 400. For example, if the navigator component 400 is displayed on a mobile device, eight user-selectable icons may be included in each of three user-selectable rings, as shown, to reduce the number of user-selectable rings, as compared to an approach which may be taken if the navigator component 400 is displayed on a larger user interface, such as on a desktop computer. For example, on a user interface displayed on the desktop computer, there may be more room to display more user-selectable rings, so the navigator component 400 may be displayed with eight user-selectable rings each including four user-selectable icons.

The navigator component 400 can, when displayed on a relatively small size of a mobile device user interface, communicate the availability of a relatively large number of workspace views, such as compared to a number of menu view links, buttons, or menu controls that might otherwise fit on the mobile device user interface if another type of control or set of controls is used. The navigator component 400 includes three user-selectable rings, where each ring includes eight user-selectable icons, for a total of twenty four user-selectable icons. If more menu views are needed or available, more user-selectable rings can be added to the navigator component 400, and the addition of a user-selectable ring can add just a fraction of an inch to the size of the navigator component 400. As another example, the size of the user-selectable rings can be reduced if a user-selectable ring is added so that the size of the navigator component 400 remains the same.

As another approach for accommodating additional or fewer menu views, the number of user-selectable icons included in each user-selectable ring or the number of user-selectable rings can be increased or decreased, respectively, such as from eight to ten or from eight to four. As an example, the navigator component 400 can accommodate a change of reducing the number of menu views from twenty four to sixteen by having a fourth user-selectable ring added and by having the number of user-selectable icons per user-selectable ring changed from eight to four. As another example, the number of user-selectable icons per user-selectable ring can be maintained as eight and the number of user-selectable rings can be changed from three to two.

Figure 5:
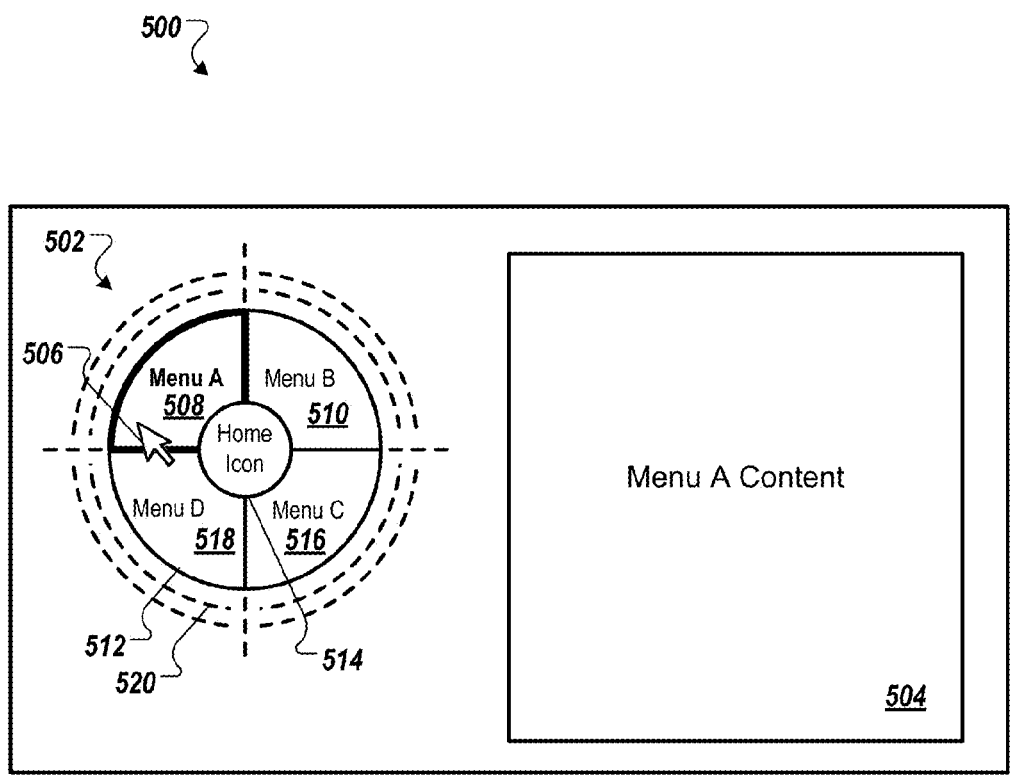

FIG. 5 illustrates an example user interface 500 that includes a navigator component 502 and a content area 504. As illustrated by a cursor 506, a user has selected a user-selectable icon 508. In response to selection of the user-selectable icon 508, a menu view for a menu "A" that is associated with the selected user-selectable icon 508 is displayed in the content area 504. If the user selects another user-selectable icon, such as a user-selectable icon 510, a different menu view (e.g., a menu view for a menu "B") can be displayed in the content area 504.

As mentioned above, in some implementations, a user-selectable icon, such as the user-selectable icon 508, is automatically selected upon selection of a user-selectable ring, such as a user-selectable ring 512. In some implementations, no user-selectable icon is automatically selected upon selection of a user-selectable ring. In such implementations, the user explicitly selects a user-selectable icon such as the user-selectable icon 508 or 510.

In some implementations, a user can use a shortcut key to select a user-selectable ring or a user-selectable icon. For example, a user can press a control key sequence to select a user selectable ring (e.g., the user can press a control key and a number "2" to select the user-selectable ring that is the second closest to a home icon 514). As another example, the user can select the home icon 514 and press a letter key to select a user-selectable icon (e.g., the user can select the home icon 514 while pressing the "A" key to select the user-selectable icon 508 corresponding to a menu "A").

In some implementations, upon selection of the user-selectable icon 508, the selected user-selectable ring 512 is replaced with two user-selectable rings, where a first added user-selectable ring includes only the selected user-selectable icon 508 and a second user-selectable ring is added as a user-selectable ring in a collapsed state inside of the first added user-selectable ring, where the second added user-selectable ring represents a set of user-selectable icons including the user-selectable icons 508 and 510 and user-selectable icons 516 and 518. The user can selected the collapsed, second user-selectable ring to cause the navigator component 502 to return to a state as shown in FIG. 5 (e.g., a state that shows all of the user-selectable icons 508, 510, 516, and 518).

In some implementations user-selectable rings are not ever in a collapsed state but rather stay in place. For example, if the user selects a user-selectable ring 520, the user-selectable icons 508, 510, 516, and 518 can be replaced with a different set of user-selectable icons (e.g., a set of user-selectable icons corresponding to menus "E", "F", "G", and "H"), the selected user-selectable ring 520 can change to have a visual indication of selection (e.g., a solid line), and the user-selectable ring 512 can change to not have the visual indication of selection (e.g., can be shown in a dashed line). The user-selectable ring 512 can remain inside of the selected user-selectable ring 520, in an uncollapsed state.

In some implementations, other controls can be included in or displayed with the navigator component 502. For example, previous and next user-selectable ring controls can be displayed, which can, for example, upon selection, select a previous, larger user-selectable ring, or a next, smaller user-selectable ring, respectively. As another example, previous and next menu controls can be displayed, which can, for example, upon selection, select a previous or next user-selectable icon. For example, assuming the user-selectable icon 508 is selected, as shown, three successive selections of a next menu control can cause, selection of the user-selectable icons 510, 516, and 518, in order. As another example, assuming again that the user-selectable icon 508 is selected, a previous menu control can cause a user-selectable icon associated with the user-selectable ring 520 to be selected (the user-selectable ring 520 may also be selected in this example). Other controls can include, for example, a show all menus control (described below with respect to FIG. 7) or a collapse all menus control.

Figure 6:
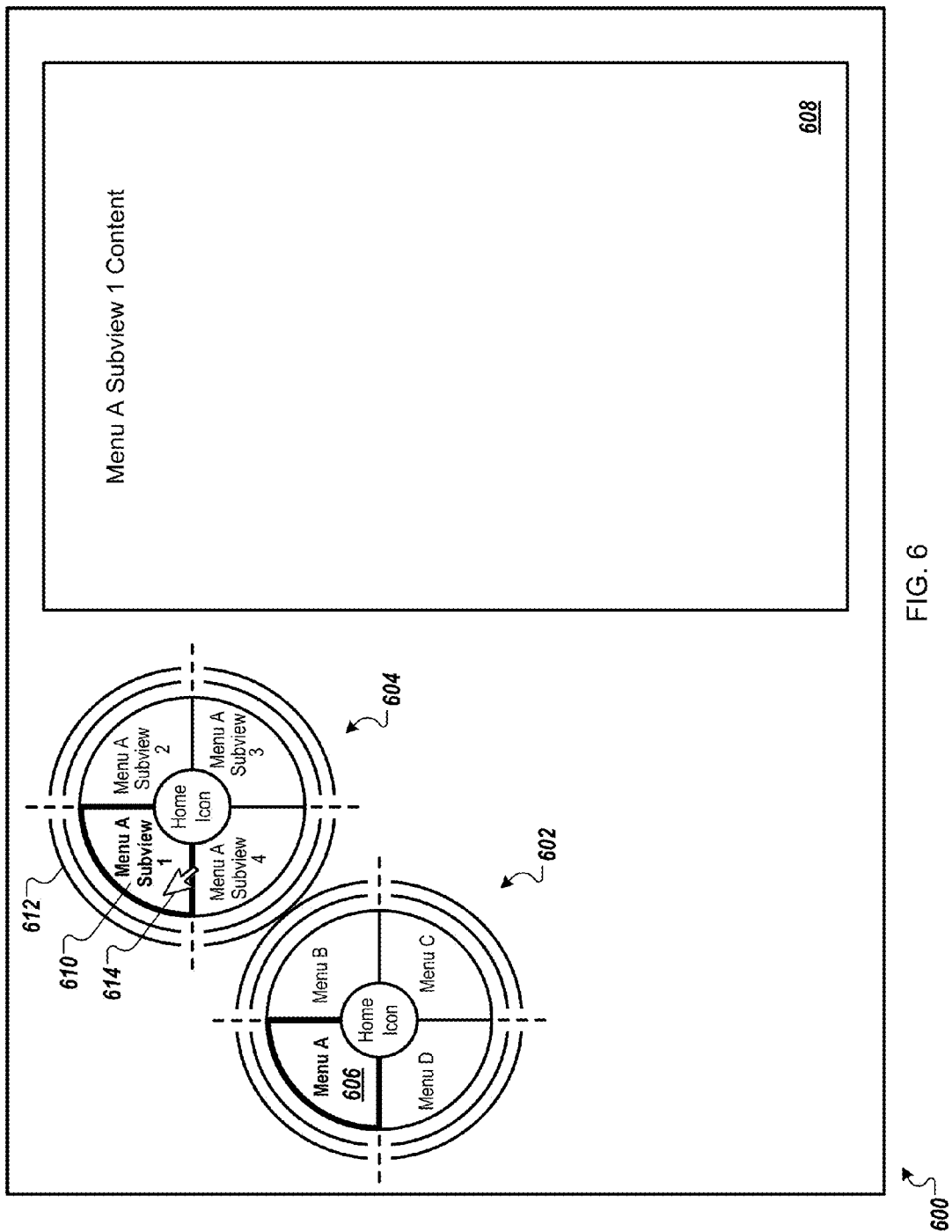
FIG. 6 illustrates an example user interface including a first navigator component and a second navigator component.

More than one navigator component can be used. FIG. 6 illustrates an example user interface 600 with a first navigator component 602 and a second navigator component 604. A user can select a user-selectable icon 606 in the first navigator component 602. In response to the selection of the user-selectable icon 606, a first menu view (e.g. a menu view corresponding to a menu "A") can be displayed in a content area 608.

Also in response to the selection of the user-selectable icon 606, the second navigator component 604 can be displayed. The second navigator component 604 can be configured for navigating subviews associated with the first menu view. For example, depending on a number of subviews associated with the first menu view, the second navigator component 604 can include multiple user-selectable icons, such as a user-selectable icon 610, and one or more user-selectable rings, such as a user-selectable ring 612. In response to user selection of the user-selectable icon 610 (e.g., as illustrated by a cursor 614), a menu subview associated with the user-selectable icon 610 and associated with the first menu view can be displayed in the content area 608. For example, the content area 608 currently displays a menu subview associated with "menu A, subview 1".

Figure 7:
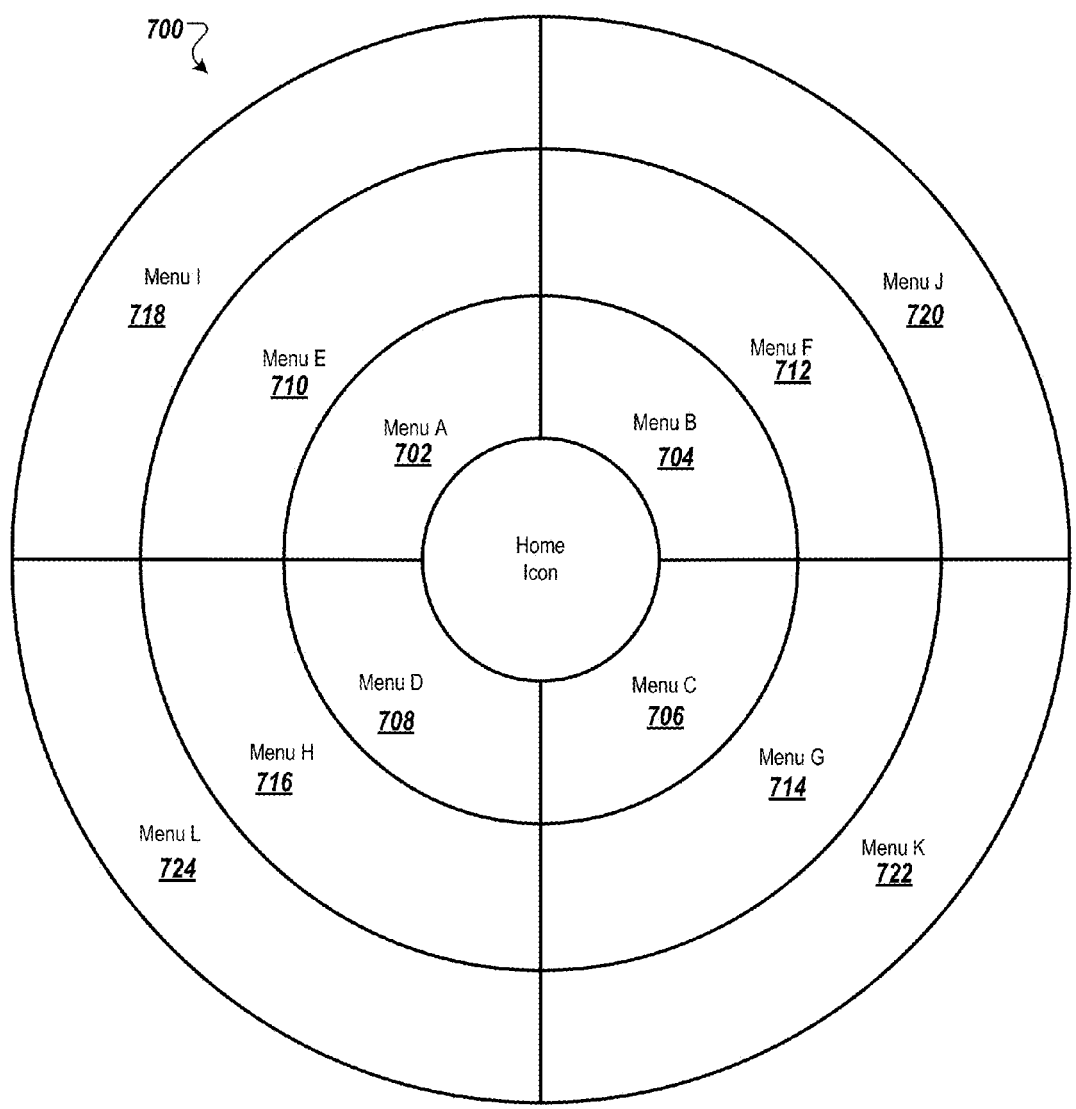
FIG. 7 illustrates an example expanded navigator component.

FIG. 7 illustrates an example expanded navigator component 700. The expanded navigator component 700 includes a set of user-selectable icons 702-724. The expanded navigator component 700, unlike the navigator components described above, does not include user-selectable rings. The user-selectable icons 702-724 represent a full set of available menu views. If a user selects one of the user-selectable icons 702-724, a menu view corresponding to the selected user-selectable icon can be displayed. In response to selection of one of the user-selectable icons 702-724, the expanded navigator component 700 can be hidden, can be shown in a smaller size, or can be replaced with a navigator component such as the navigator component 102 shown in FIG. 1A. The expanded navigator component 700 can be displayed, for example, in response to selection of the "show all menus" control mentioned above.

In some implementations, the icons 702-724 are not user-selectable, in which case the expanded navigator component 700 indicates availability of available menu views but does not provide a means to navigate to a particular menu view. In some implementations, whether the icons 702-724 are user-selectable and/or whether content is displayed concurrently with the expanded navigator 700 may depend on the size of a user interface on which the expanded navigator component 700 is displayed. For example, if the expanded navigator component 700 is displayed in a user interface on a desktop computer display device, the expanded navigator component 700 can be displayed in a portion of the user interface and another portion of the user interface may be used to display content, such as a menu view.

As another example, if the expanded navigator component 700 is displayed on a user interface on a mobile device, the expanded navigator component 700 can occupy most or all of the mobile device user interface without other content being displayed on the mobile device user interface. In such an example, the expanded navigator component 700 can be replaced with a menu view upon selection of a user-selectable icon 702-724. The menu view can include a control to redisplay the expanded navigator component 700.

Figure 8:
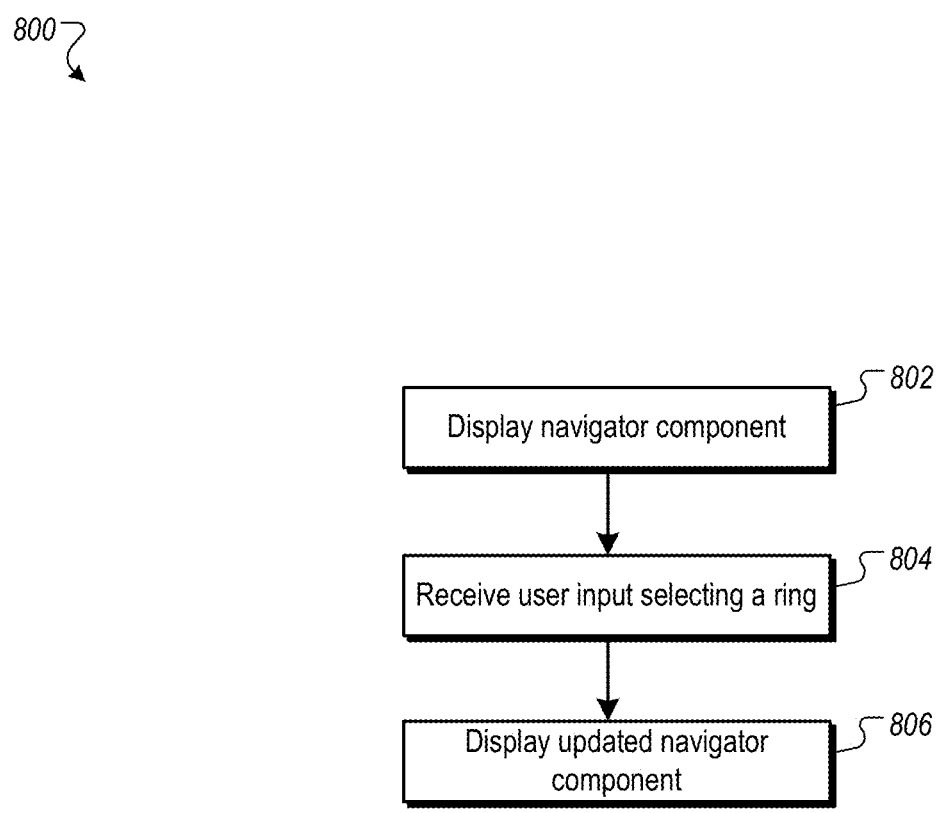
FIG. 8 shows a flow chart of an example of a method that can be used for visually representing a structure of menu views.

FIG. 8 shows a flow chart of an example of a method 800 that can be used for visually representing a structure of menu views. The method 800 can be performed by a processor executing instructions in a computer program product. In step 802, a navigator component is displayed, including (i) a home icon configured to transition the navigator component to an earlier state, (ii) user-selectable rings that are centered on the home icon and represent sets of the menu views, including a first ring that currently has a visual indication of selection, and (iii) first user-selectable icons that belong to the first ring and are located between the home icon and at least one of the user-selectable rings, each first user-selectable icon configured to cause one of the menu views to be displayed. For example, the navigator component 102 can be displayed, where the navigator component 102 includes the home icon 112, the user-selectable rings 106, 108, and 110, and where the user-selectable ring 106 has a visual indication of selection. The navigator component 102 includes user-selectable icons 114, 116, 118, and 120 which belong to the user-selectable ring 106, where the user-selectable icons 114, 116, 118, and 120 are configured to cause a menu view for a menu "A", "B", "C", or "D", respectively, to be displayed.

In step 804, a user input selecting a second ring of the user-selectable rings is received. For example, the cursor 204 can be used to select the user-selectable ring 206. A user-selectable ring can be selected, for example, using a cursor, using a finger, such as the finger 158, using a shortcut key sequence, or using some other form of user input.

In step 806, an updated navigator component is displayed, (i) including second user-selectable icons that belong to the second ring, instead of the first user-selectable icons, and (ii) wherein the second ring currently has, and the first ring currently does not have, the visual indication of selection. For example, in response to selection of the user-selectable ring 206, the user-selectable icons 212, 214, 216, and 218 can be displayed, instead of the user-selectable icons 114, 116, 118, and 120. The user-selectable ring 206 has a visual indication of selection (e.g., a thick line width) and the previously-selected user-selectable ring 208 does not have a visual indication of selection.

The visual indication of selection can include, for example, one or more of a color, a thickness, and a line style. For example, the selected user-selectable ring 302 has a visual indication of selection of a black line color while the unselected user-selectable rings 304 and 306 have a different, red line color. As another example, the selected user-selectable ring 404 has a visual indication of selection of a solid line style and the unselected user-selectable rings 406 and 408 have a different, dashed-line style.

As another example, the visual indication of selection can be managed such that any of the user-selectable rings that is closer to the home icon than the first or second ring having the visual indication of selection is in a collapsed state relative to the home icon, with the first or second ring being a smallest ring that is not in the collapsed state. For example, the selected user-selectable ring 206 is the smallest ring of the navigator component 202 that is not in a collapsed state and the user-selectable ring 208, which is smaller than the user-selectable ring 206, is in a collapsed state.

Figure 9:
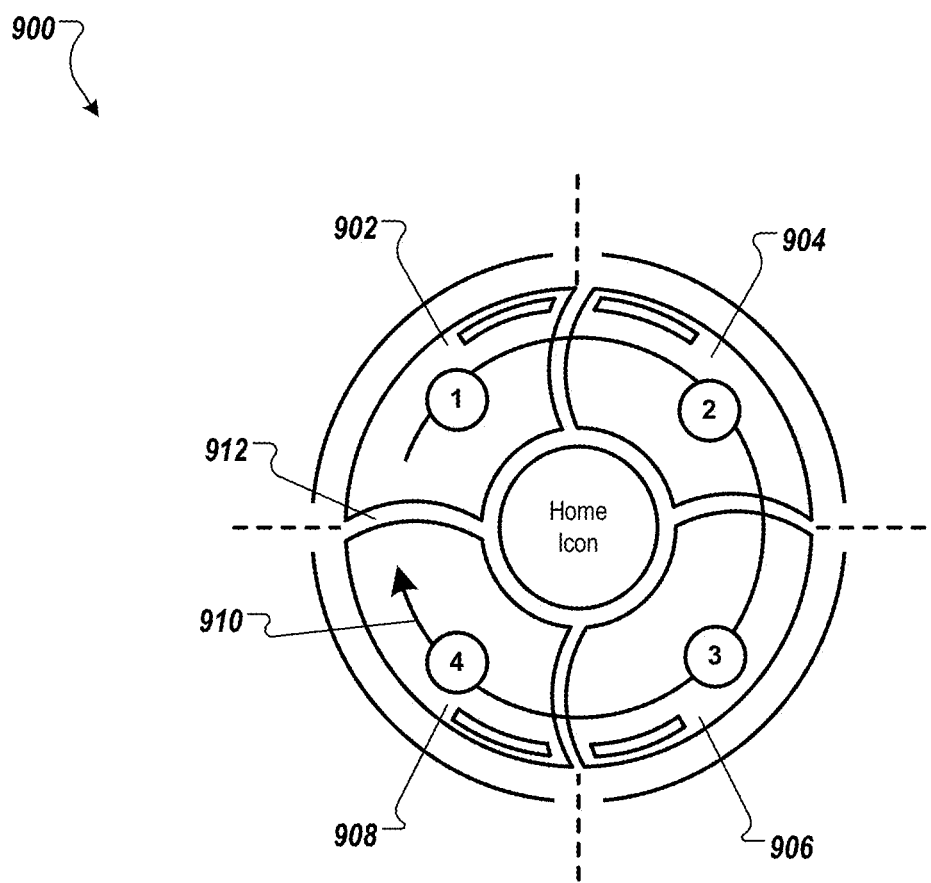

In some implementations, two or more menu views associated with the same navigator component belong to a common category, such as procurement, to name just one example. The user-selectable icons can then be provided with designs so that they collectively have an appearance that represents the common category. For example, the designs can indicate the structure and/or organization of the menu views. FIG. 9 illustrates an example navigator component 900 which visually represents a structure of menu views corresponding to user-selectable icons 902-908, where the menu views belong to a common category.

In some implementations, a common use scenario may be that the user is expected to access some or all of the respective menu views in a predetermined order. For example, the menu views corresponding to the user-selectable icons 902-908 can belong to a procurement category and can be used for procurement functions of sourcing, purchasing, goods receipt, and supplier invoicing, respectively. Accordingly, the predetermined order can be defined based on the order in which these functions are normally carried out in a procurement process. Moreover, each of the user-selectable icons 902-908 can be provided with a respective design such that, when displayed in the navigator component 900, the user-selectable icons 902-908 collectively have an appearance that represents the procurement category.

The collective appearance of the user-selectable icons 902-908 can indicate a functional sequence of the respective menu views. For example, each of the respective designs of the user-selectable icons 902-908 can include a respective visual flow segment, and the visual flow segments can collectively indicate the functional sequence. For example, the navigator component 900 includes an arrow 910, which starts in the user-selectable icon 902 (which here includes, for example, a "1" indicator), proceeds clockwise and passes through the user-selectable icons 904 and 906 (which here respectively include "2" and "3" indicators), and ends in the user-selectable icon 908 (which here includes a "4" indicator). The arrow 910 indicates that a functional sequence for procurement can involve performing the sourcing, purchasing, goods receipt, and supplier invoicing functions in that order.

The arrow 910, by passing through each of the user-selectable icons 902-908, can indicate that each of the user-selectable icons 902-908 belong to the same procurement category. Each of the user-selectable icons 902-908 is configured to cause, upon user selection, an associated menu view to be displayed. The boundary between adjacent user-selectable icons (e.g., a gap 912 in this example) can serve to indicate that each of the user-selectable icons 902-908 is individually selectable.

Figure 10:
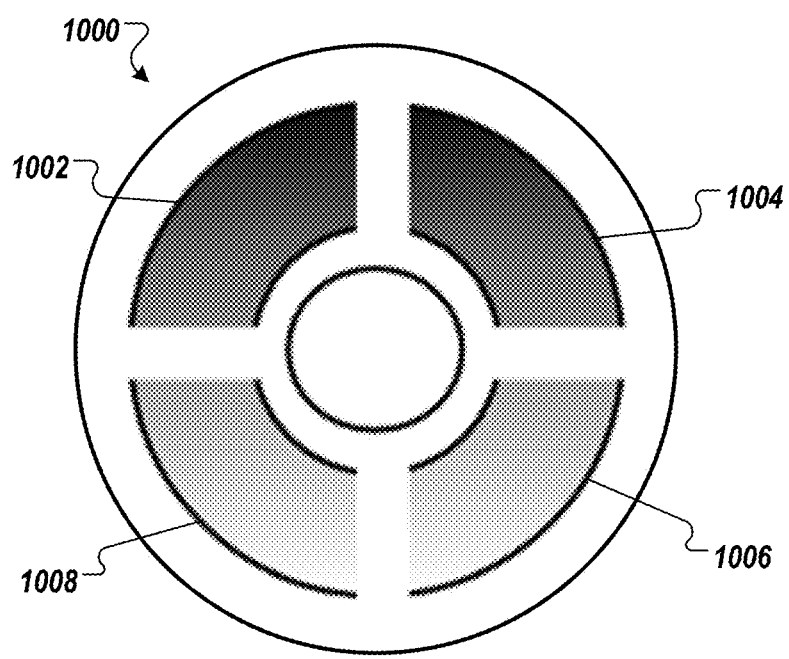

Other designs can be used. For example, FIG. 10 illustrates an example navigator component 1000 which visually represents a structure of menu views corresponding to user-selectable icons 1002-1008. The user-selectable icons 1002-1008 can be colored, for example, to indicate a functional sequence of the corresponding respective menu views. For example, the user-selectable icons 1002 can be colored such that a darker color is used for icons corresponding to menu views occurring earlier in the functional sequence (e.g., the user-selectable icon 1004 has a darker color than the user-selectable icon 1006).

Figure 11:
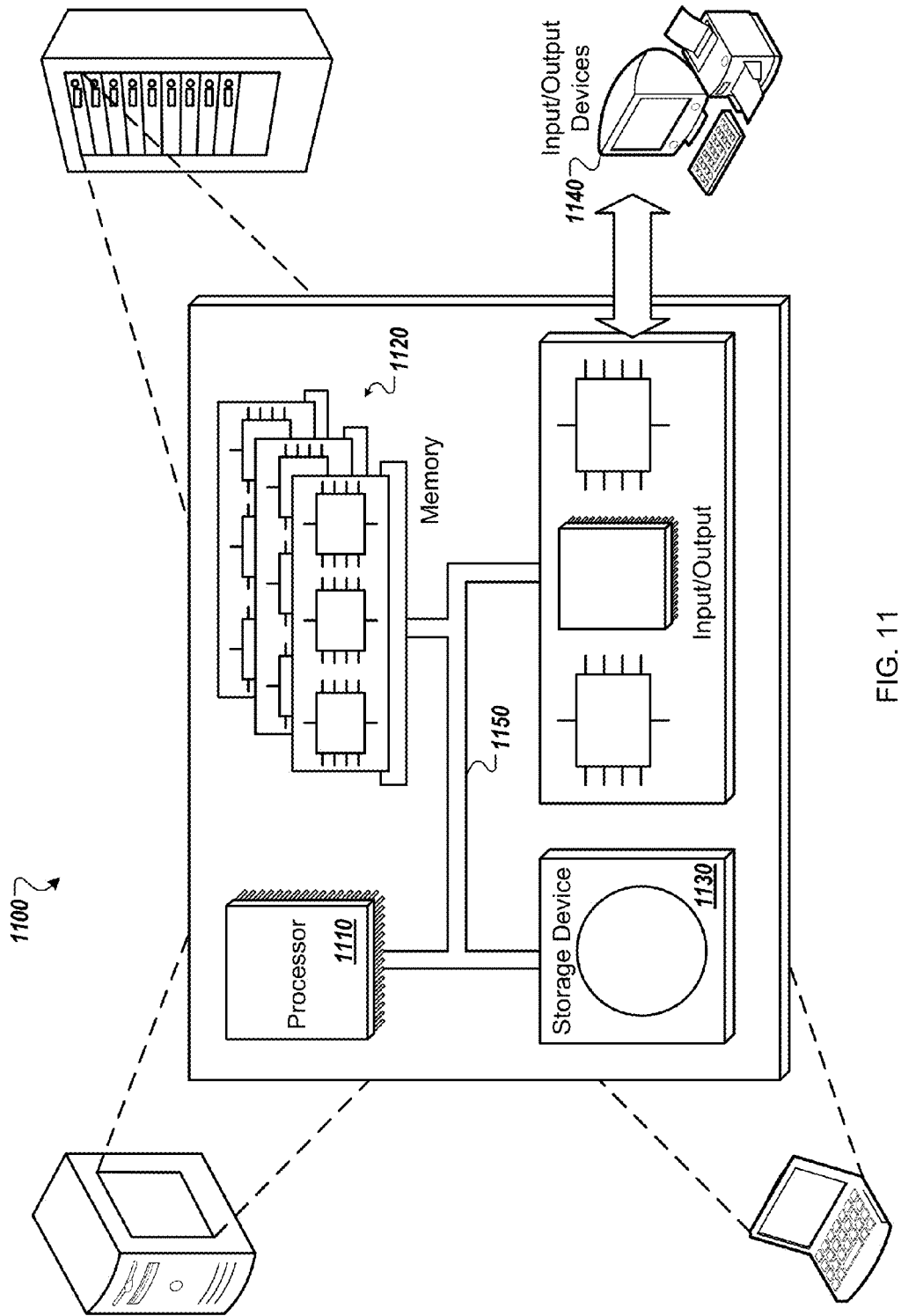
FIG. 11 is a block diagram of a computing system that can be used in connection with computer-implemented methods described in this document.

FIG. 11 is a schematic diagram of a generic computer system 1100. The system 1100 can be used for the operations described in association with any of the computer-implement methods described previously, according to one implementation. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In some implementations, the memory 1120 is a computer-readable medium. The memory 1120 is a volatile memory unit in some implementations and is a non-volatile memory unit in other implementations.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for visually representing a structure of menu views, the method comprising:
   displaying a navigator component comprising
   (i) a home icon configured to transition the navigator component to an earlier state,
   (ii) user-selectable rings that are centered on the home icon and represent sets of the menu views, comprising a first ring that currently is in an uncollapsed state relative to the home icon and has a visual indication of selection, and
   (iii) first user-selectable icons that belong to the first ring and are located between the home icon and at least one of the user-selectable rings, each first user-selectable icon configured to cause one of the menu views to be displayed;
   receiving a user input selecting a second ring of the user-selectable rings, the second ring being in a collapsed state relative to the home icon;
   transitioning the first ring from the uncollapsed state to the collapsed state relative to the home icon and the second ring from the collapsed state to the uncollapsed state relative to the home icon, such that a size of the navigator component remains the same; and
   displaying an updated navigator component (i) comprising the first ring in the collapsed state relative to the home icon and second user-selectable icons that belong to the second ring in the uncollapsed state, instead of the first user-selectable icons, and (ii) wherein the second ring currently has, and the first ring currently does not have, the visual indication of selection;
   wherein the menu views corresponding to the first user-selectable icons belong to a common category, and wherein each of the first user-selectable icons is provided with a respective design such that the first user-selectable icons when displayed in the navigator component collectively have an appearance that represents the common category.

2. The computer-implemented method of claim 1, wherein the visual indication of selection comprises one or more of a color, a thickness, and a line style of the first ring.

3. The computer-implemented method of claim 1, wherein the visual indication of selection comprises that any of the user-selectable rings that is closer to the home icon than the first or second ring having the visual indication of selection is in a collapsed state relative to the home icon, with the first or second ring being a smallest ring that is not in the collapsed state.

4. The computer-implemented method of claim 3, wherein displaying the updated navigator component further comprises:
   in response to receiving the user input selecting the second ring, (i) if the second ring is currently in the collapsed state, changing the second ring, and each other ring larger than the second ring that is currently also in the collapsed state, to be in an uncollapsed state instead of the collapsed state, or (ii) if the second ring is currently in the uncollapsed state, changing each other ring smaller than the second ring that is currently also in the uncollapsed state to be in the collapsed state instead of the uncollapsed state.

5. The computer-implemented method of claim 4, wherein the first ring when in the collapsed state is located outside of the home icon and within the area occupied by the user-selectable icons and the first ring when in the uncollapsed state is located outside of the user-selectable icons.

6. The computer-implemented method of claim 1, wherein the number of the first user-selectable icons depends on a role associated with a user accessing the navigator component.

7. The computer implemented method of claim 1, wherein the earlier state is a home state or a previous state.

8. The computer-implemented method of claim 1 further comprising:
   receiving a user input selecting one of the second user-selectable icons;
   displaying a first menu view that is associated with the selected user-selectable icon; and
   displaying a second navigator component configured for navigating subviews associated with the first menu view.

9. The computer-implemented method of claim 1 further comprising:
   receiving a user input for expanding the navigator component;
   updating the navigator component to an expanded navigator component,
   the expanded navigator component comprising the home icon and a visible set of user-selectable icons for each of the user-selectable rings.

10. The computer-implemented method of claim 1, wherein the appearance includes a functional sequence of the respective menu views, wherein each of the designs includes a respective visual flow segment, and wherein the visual flow segments collectively indicate the functional sequence.

11. A computer program product tangibly embodied in a non-transitory computer-readable storage medium and comprising instructions that when executed by a processor perform a method for visually representing a structure of menu views, the method comprising:
   displaying a navigator component including comprising (i) a home icon configured to transition the navigator component to an earlier state, (ii) user-selectable rings that are centered on the home icon and represent sets of the menu views, comprising a first ring that currently is in an uncollapsed state relative to the home icon and has a visual indication of selection, and (iii) first user-selectable icons that belong to the first ring and are located between the home icon and at least one of the user-selectable rings, each first user-selectable icon configured to cause one of the menu views to be displayed;
   receiving a user input selecting a second ring of the user-selectable tings the second ring being in a collapsed state relative to the home icon;
   transitioning the first ring from the uncollapsed state to the collapsed state relative to the home icon and the second ring from the collapsed state to the uncollapsed state relative to the home icon, such that a size of the navigator component remains the same; and displaying an updated navigator component (i) comprising the first ring in the collapsed state relative to the home icon and second user-selectable icons that belong to the second ring in the uncollapsed state, instead of the first user-selectable icons, and (ii) wherein the second ring currently has, and the first ring currently does not have, the visual indication of selection;
   wherein the menu views corresponding to the first user-selectable icons belong to a common category, and wherein each of the first user-selectable icons is provided with a respective design such that the first user-selectable icons when displayed in the navigator component collectively have an appearance that represents the common category.

12. The computer program product of claim 11, wherein the visual indication of selection comprises that any of the user-selectable rings that is closer to the home icon than the first or second ring having the visual indication of selection is in a collapsed state relative to the home icon, with the first or second ring being a smallest ring that is not in the collapsed state.

13. The computer program product of claim 11, wherein displaying the updated navigator component further comprises:
   in response to receiving the user input selecting the second ring, (i) if the second ring is currently in the collapsed state, changing the second ring, and each other ring larger than the second ring that is currently also in the collapsed state, to be in an uncollapsed state instead of the collapsed state, or (ii) if the second ring is currently in the uncollapsed state, changing each other ring smaller than the second ring that is currently also in the uncollapsed state to be in the collapsed state instead of the uncollapsed state.

14. The computer program product of claim 11, wherein the first ring when in the collapsed state is located outside of the home icon and within the area occupied by the user-selectable icons and the first ring when in the uncollapsed state is located outside of the user-selectable icons.

15. A non-transitory computer-readable storage medium encoded with a computer program, the computer program comprising instructions that, when executed, generate on a display device a graphical user interface for visually representing a structure of menu views, the graphical user interface comprising: a navigator component comprising (i) a home icon configured to transition the navigator component to an earlier state, (ii) user-selectable rings that are centered on the home icon and represent sets of the menu views, comprising a first ring that currently is in an uncollapsed state relative to the home icon and has a visual indication of selection, and (iii) first user-selectable icons that belong to the first ring and are located between the home icon and at least one of the user-selectable rings, each first user-selectable icon configured to cause one of the menu views to be displayed;
   wherein the graphical user interface is configured to display, upon receiving a user input selecting a second ring of the user-selectable rings, the second ring being in a collapsed state relative to the home icon and transitioning the first ring from the uncollapsed state to the collapsed state relative to the home icon and the second ring from the collapsed state to the uncollapsed state relative to the home icon, such that a size of the navigator component remains the same, an updated navigator component (i) comprising the first ring in the collapsed state relative to the home icon and second user-selectable icons that belong to the second ring in the uncollapsed state, instead of the first user-selectable icons, and (ii) wherein the second ring currently has, and the first ring currently does not have, the visual indication of selection;

wherein the menu views corresponding to the first user-selectable icons belong to a common category, and wherein each of the first user-selectable icons is provided with a respective design such that the first user-selectable icons when displayed in the navigator component collectively have an appearance that represents the common category.

16. The non-transitory computer-readable storage medium of claim 15, wherein the visual indication of selection comprises that any of the user-selectable rings that is closer to the home icon than the first or second ring having the visual indication of selection is in a collapsed state relative to the home icon, with the first or second ring being a smallest ring that is not in the collapsed state.

17. The non-transitory computer-readable storage medium of claim 15, wherein the updated navigator is configured, in response to receiving the user input selecting the second ring, to (i) if the second ring is currently in the collapsed state, change the second ring, and each other ring larger than the second ring that is currently also in the collapsed state, to be in an uncollapsed state instead of the collapsed state, and (ii) if the second ring is currently in the uncollapsed state, change each other ring smaller than the second ring that is currently also in the uncollapsed state to be in the collapsed state instead of the uncollapsed state.

18. The non-transitory computer-readable storage medium of claim 15, wherein the appearance includes a functional sequence of the respective menu views, wherein each of the designs includes a respective visual flow segment, and wherein the visual flow segments collectively indicate the functional sequence.

* * * * *